United States Patent
Kaya et al.

(10) Patent No.: US 7,772,317 B2
(45) Date of Patent: Aug. 10, 2010

(54) RESIN MOLDING MATERIAL

(75) Inventors: Michiko Kaya, Ibaraki (JP); Hiroto Oda, Ibaraki (JP); Teiichi Inada, Ibaraki (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 93 days.

(21) Appl. No.: 12/092,838

(22) PCT Filed: Nov. 10, 2006

(86) PCT No.: PCT/JP2006/322503

§ 371 (c)(1),
(2), (4) Date: May 7, 2008

(87) PCT Pub. No.: WO2007/055338

PCT Pub. Date: May 18, 2007

(65) Prior Publication Data

US 2009/0227723 A1    Sep. 10, 2009

(30) Foreign Application Priority Data

Nov. 11, 2005  (JP)  .............................. 2005-327421
Apr. 3, 2006   (JP)  .............................. 2006-101786
May 26, 2006   (JP)  .............................. 2006-146699

(51) Int. Cl.
*C08K 3/04*    (2006.01)
*C08K 3/36*    (2006.01)
*C08L 71/12*   (2006.01)
*C08L 27/12*   (2006.01)

(52) U.S. Cl. .................. 524/495; 524/424; 524/502; 524/847

(58) Field of Classification Search .............. 524/495, 524/424, 502, 847
See application file for complete search history.

(56) References Cited

U.S. PATENT DOCUMENTS

2005/0121653 A1    6/2005    Chacko

FOREIGN PATENT DOCUMENTS

| JP | 04-371807 | 12/1992 |
| JP | 06-045200 | 6/1994 |
| JP | 07-157633 | 6/1995 |
| JP | 08-101446 | 4/1996 |
| JP | 08-319399 | 12/1996 |
| JP | 09-194685 | 7/1997 |
| JP | 10-053692 | 2/1998 |
| JP | 10-168279 | 6/1998 |
| JP | 10-226752 | 8/1998 |
| JP | 11-080501 | 3/1999 |
| JP | 2000-273321 | 10/2000 |
| JP | 2003238820 A * | 8/2003 |
| JP | 2004-204031 | 7/2004 |
| JP | 2004-256687 | 9/2004 |
| JP | 2004256687 A * | 9/2004 |
| JP | 2005-048009 | 2/2005 |
| JP | 2005133647 A * | 5/2005 |
| JP | 2005-307090 | 11/2005 |

\* cited by examiner

*Primary Examiner*—Kelechi C Egwim
(74) *Attorney, Agent, or Firm*—Antonelli, Terry, Stout & Kraus, LLP.

(57) ABSTRACT

Provided is a resin molding material having a remarkably excellent abrasion resistance while maintaining a favorable mechanical strength. The resin molding material is improved in deterioration of the abrasion resistance caused by an abrasive powder generated from an inorganic substance, particularly from a glass fiber or the like. The resin molding material contains a resin, a carbon substance and an inorganic substance. The carbon substance contains an adhesive carbon substance.

18 Claims, No Drawings

RESIN MOLDING MATERIAL

TECHNICAL FIELD

The present invention relates to a resin molding material, and more particularly, to a resin molding material which has a favorable mechanical strength, is extremely excellent in abrasion resistance, and is suitable for a sliding unit material formed of a resin.

BACKGROUND OF THE INVENTION

Along with resent requirements for reductions of size and weight of a sliding unit, a phenolic resin molding material containing a glass fiber as a main filler is used in place of a metal material.

A phenolic resin molding material which contains a glass fiber as a filler, and in which a blending amount of a glass fiber is increased has sufficient property as a material replacing a metal material in terms of a heat resistance, dimensional stability, and strength. However, an abrasion resistance is prone to reduce with increase in an addition amount of the glass fiber, which makes it difficult to apply the phenolic resin molding material to a case requiring the abrasion resistance.

When a glass fiber is added so as to secure the strength of a molded article, the surface of the molded article is abraded by abrasive powders generated from the glass fiber crushed due to abrasion, sometimes resulting in increased surface irregularities and reduced abrasion resistance.

Then, many attempts have been made to improve the abrasion resistance of the phenolic resin molding material containing a glass fiber as the filler.

For example, Patent Document 1 discloses an invention of a resin pulley containing a novolac phenolic resin as a base resin and containing a glass fiber and glass bead as the main fillers. Patent Document 2 discloses an invention of a phenolic resin molding material containing an aramid fiber, a glass fiber, and a glass powder as the main fillers. Patent Document 3 discloses an invention of a phenolic resin molding material containing a glass fiber as the main filler and containing an organic natural material and a lubricant for improving the abrasion resistance.

However, because the above-mentioned phenolic resin molding materials each contain a glass fiber as the main filler, the materials have not met the latest requirement of further improving the abrasion resistance.

Therefore, in order to improve the abrasion resistance, there has been invented a molding material, which contains, in addition to a main component, various substances and further various lubricative substances (a friction modifier and a solid lubricant) in order to control the dynamic friction coefficient of the surface or to smoothen the surface.

Patent Document 4 reports a use of a carbon fiber whose crystal structure is an onion structure [e.g., PAN (polyacrylonitrile) base]. However, the abrasion resistance is insufficient, despite that the mechanical strength is improved.

Patent Document 5 discloses an improvement of an abrasion resistance by adding graphite, and Patent Document 6 discloses an improvement of the abrasion resistance by adding black lead. However, the addition thereof has a disadvantage in that the mechanical strength is reduced.

As described above, the improvement of the abrasion resistance is attempted, but it is extremely difficult to maintain a high abrasion resistance without reducing the mechanical strength.

Patent Document 7 discloses an invention of a phenolic resin molding material, which uses a glass fiber and wollastonite as the main fillers and contains an organic natural material and graphite.

Patent Document 8 discloses an invention of a molding material having an abrasion resistance and containing calcined clay. Patent Document 9 discloses an invention of a molding material having an abrasion resistance and containing a polyimide powder and pulp powders.

Patent Document 10 discloses an invention of a molding material which is obtained by adding a fluororesin powder and a polyethylene powder to a thermosetting resin. Patent Document 11 discloses an invention of a phenolic molding material containing graphite.

When a lubricative substance is added to a resin, the processability and moldability at the time of production sometimes decrease due to slipping property of the lubricative substance itself. Thus, the addition amount of the lubricative substance to a molding material is limited.

Moreover, when the addition amount of the lubricative substance increases, close adhesion with a resin decreases, and the mechanical strength of the molding material may decrease in some cases.

Therefore, in order to improve the abrasion resistance, a technology of reducing the addition amount of the lubricative substance and efficiently demonstrating an abrasion resistance effect has been demanded.

Further, as a recent requirement to a metal-replacement resin for sliding units of automobiles, industrial machines, etc., further improvement in the abrasion resistance and cost reduction have been desired.

Patent Document 1: JP 06-45200 B
Patent Document 2: JP 04-371807 A
Patent Document 3: JP 10-53692 A
Patent Document 4: JP 11-80501 A
Patent Document 5: JP 09-194685 A
Patent Document 6: JP 2004-204031 A
Patent Document 7: JP 08-101446 A
Patent Document 8: JP 08-319399 A
Patent Document 9: JP 07-157633 A
Patent Document 10: JP 2000-273321 A
Patent Document 11: JP 07-157633 A

DISCLOSURE OF THE INVENTION

The present invention has been made in view of the above-described viewpoints, and aims to provide a resin molding material which is improved in abrasion resistance reduced due to abrasion powder generated from inorganic materials, especially a glass fiber and the like, is reduced in the cost while maintaining a favorable mechanical strength and moldability, and is extremely excellent in the abrasion resistance.

The inventors of the present invention continued extensive research, and found that the above-described objects can be achieved by incorporating a specific carbon substance, a specific inorganic material, and further a lubricative substance to a resin.

The present invention has been accomplished based on such findings.

That is the present invention provides:

1. a resin molding material, comprising: a resin; a carbon substance; and an inorganic substance, wherein the carbon substance comprises an adhesive carbon substance.

2. a resin molding material, comprising: a resin; a carbon substance; and an inorganic substance, wherein the carbon substance has a true specific gravity of 1.8 or more.

3. a resin molding material, comprising: a resin; a carbon substance; and an inorganic substance, wherein the carbon substance has a half-power band width ratio (T1)/(T2) of 17 or lower, wherein T1 is a half-power band width of a diffraction peak of a surface (002) observed by an X-ray diffraction and T2 is a half-power band width of a diffraction peak of a standard silicon surface (111) observed under the same conditions.

4. a resin molding material according to any one of the above items 1 to 3, wherein a content of the adhesive carbon substance is 1.5 to 180 parts by mass based on 100 parts by mass of the resin.

5. a resin molding material according to any one of the above items 1 to 4, wherein a content of the inorganic substance is 33 to 350 parts by mass based on 100 parts by mass of the resin.

6. a resin molding material according to any one of the above items 1 to 5, wherein the resin comprises a phenolic resin.

7. a resin molding material according to any one of the above items 1 to 6, wherein the inorganic substance is at least one kind selected from silica, glass, and wollastonite.

8. a resin molding material according to claim 7, wherein the silica comprises a spherical silica.

9. a resin molding material according to claim 7, wherein the glass comprises a glass fiber.

10. a resin molding material according to claim 7, in which a content of wollastonite is 80 to 200 parts by mass based on 100 parts by mass of the resin.

11. a resin molding material according to anyone of the above items 1 to 10, wherein the carbon substance is in a form of fiber.

12. a resin molding material according to claim 11, wherein the carbon substance in the form of fiber comprises a pitch-based carbon fiber.

13. a resin molding material according to claim 11 or 12, wherein an average fiber length of the carbon substance in the form of fiber is 10 to 250 µm in a stage after the carbon substance is kneaded with a resin.

14. a resin molding material according to anyone of the above items 1 to 13, further comprising a lubricative substance.

15. a resin molding material according to claim 14, wherein the lubricative substance is at least one kind selected from a polyethylene resin, a nylon resin, a fluororesin, and a polypropylene-based resin.

16. a resin molding material according to claim 15, wherein the lubricative substance comprises a fluororesin.

17. a resin molding material according to claim 16, wherein the fluororesin comprises polytetrafluoroethylene.

18. a resin molding material according to anyone of the above items 14 to 17, wherein an average particle diameter of the lubricative substance is 2 to 110 µm.

19. a resin molding material according to any one of the above items 14 to 18, wherein a content of the lubricative substance is 0.2 to 35 parts by mass based on 100 parts by mass of the resin.

BEST MODE FOR CARRYING OUT THE INVENTION

The resin molding material of the present invention relates to a resin molding material containing a resin, a carbon substance, and an inorganic material, and further a lubricative substance, and has a feature that the carbon substance has adhesion to at least one of the resin and the inorganic material.

Hereinafter, the resin molding material may be simply referred to as "molding material."

There is no limitation on a resin usable for the resin molding material of the present invention as long as the resin can be molded.

As a thermoplastic resin, there are exemplified a polyethylene resin, a polypropylene resin, a vinyl chloride resin, a vinylydene chloride resin, a styrene resin, a vinyl acetate resin, a fluororesin, a polytetrafluoroethylene, an acrylonitrile/butadiene/styrene resin, an acrylonitrile/styrene resin, an acrylic resin, a methacrylic resin, a polyamide resin, a polyacetal resin, a polycarbonate resin, a polyphenylene ether resin, a polyester resin, a cyclic polyolefin resin, a polyphenylene sulfide resin, a polysulfonic resin, a polyether sulfonic resin, a polyarylate resin, a polyether etherketone resin, and a polyimide resin.

As a thermosetting resin, there are exemplified a phenolic resin, an epoxy resin, a melamine resin, a urea resin, an unsaturated polyester resin, and an alkyd resin.

The above-mentioned resins can be used in combination of two or more members.

As a resin, a phenolic resin is preferred among the above-mentioned resins.

As the phenolic resin used for the molding material of the present invention, a novolac phenolic resin or a resol phenolic resin may be used singly or in combination thereof.

There is no limitation on the novolac phenolic resin used in the present invention, and, for example, a random novolac resin and a high-orthonovolac resin are mentioned.

The novolac phenolic resin can be synthesized by reacting a phenol with formaldehyde in the presence of an acid catalyst such as oxalic acid and in the presence of a salt of a Group 2 element or a transition element and an organic monocarboxylic acid such as formic acid or acetic acid, or in the presence of a salt of a Group 2 element and an inorganic acid such as boric acid, hydrochloric acid, or nitric acid.

There is no limitation on the resol type phenolic resin used in the present invention, and a methylol type and a dimethylene ether type are mentioned. Of those, it is preferred to use the dimethylene ether type because a balance of curing property and thermal stability is favorable.

The dimethylene ether resole type resin can be synthesized by reacting a phenol with formaldehyde in the presence of a salt of a Group 2 element or a transition element and an organic monocarboxylic acid such as formic acid or acetic acid, or in the presence of a salt of a Group 2 element or a transition element and an inorganic acid such as boric acid, hydrochloric acid, or nitric acid.

As the dimethylene ether resole resin used in the present invention, a dimethylene ether resole resin having a dimethylene ether group in a content of 20 to 70 mol % and a number average molecular weight of 400 to 1,000 is preferred in terms of curing ability.

The softening point of the resol type phenolic resin is not limited, and is preferably 70° C. or higher because the processability is excellent.

More specifically, the resol type resin is easily crushed and is easily mixed with another filler and the like.

When using the novolac type phenolic resin, it is generally preferred to blend, to a phenolic resin, hexamethylene tetramine as a curing agent in a proportion of 10 to 25 mass %. The content thereof is more preferably 12 to 18 mass %.

When hexamethylenetetramine is blended in a proportion of 10 mass % or higher, curing is sufficiently performed.

When hexamethylenetetramine is added in a proportion of 25 mass % or lower, curing is sufficiently performed and also no molding defect due to decomposed gas or the like does not occur.

The carbon substance used for the resin molding material of the present invention has adhesion to at least either of the resin and the inorganic material.

In general, the true specific gravity of the carbon substance of the present invention is preferably 1.8 or more, more preferably 1.8 to 2.5, and still more preferably 1.8 to 2.3.

When the true specific gravity falls under the above-mentioned range, a lubrication effect is readily obtained and the adhesion is excellent. Thus, the resin molding material containing the carbon substance is excellent in abrasion resistance.

Moreover, the half-power band width ratio $(T1)/(T2)$ of a half-power band width $(T1)$ of the diffraction peak of a surface (002) of the carbon substance of the present invention observed by the X-ray diffraction to a half-power band width $(T2)$ of the diffraction peak of a standard silicon surface (111) observed by the X-ray diffraction under the same conditions is generally preferably 17 or lower.

When the half-power band width ratio $(T1)/(T2)$ is equal to or lower than the above-mentioned value, crystallinity becomes high and cleavage is likely to occur, which results in that the abrasion surface is easily flattened. Moreover, since adhesive abrasion powders are likely to generate, the abrasion resistance is improved.

Mentioned as an adhesive carbon substance used for the resin molding material of the present invention is a carbon material which adheres to and remains on the surface of a glass plate in 0.1 mass % or higher based on the total mass X of carbon material placed on the glass plate after the following process: a glass plate having no irregularities is fixed to a base at room temperature (25° C.); a carbon substance which has been weighed to 10 to 30 mg is placed on the center portion of the surface of the plate to which load is applied; the carbon substance is continuously moved back and forth 100 times over the length of 4 cm, respectively, while applying a load of 2 to 3 kgf/cm$^2$ (0.196 to 0.294 MPa); and then a cotton gauze cloth is moved back and forth 10 times on the glass plate under a load of 10 g (98 mN) to thereby thoroughly remove the carbon substance which remains in the form of particle on the surface of the glass plate.

The adhesive carbon substance may have adhesion to a resin and/or an inorganic material.

The carbon substance which adheres to and remains on the surface of the plate is preferably 1 mass % or higher, and more preferably 2 mass % or higher.

The adhesive carbon substance may be used singly or in combination of two or more members.

Moreover, even in the case of a mixture of the adhesive carbon substance and a non-adhesive carbon substance, two or more of such a mixture may be combined insofar as the mixture has adhesion.

In the case of a mixture containing a combination of two or more kinds of carbon substances, it is preferred to adjust the proportion of the adhesive carbon substances to 1.5 to 180 parts by mass based on 100 parts by weight of the resin, in general.

In the case where the carbon substance is a mixture of two or more members and the type of each carbon material is not known, the mass of a carbon substance which shows adhesion property by only itself is indefinite. Thus, it is necessary to find a suitable addition amount by changing the addition amount. However, when the mixture has adhesion, the mechanical strength and the abrasion resistance effect can be developed by adding an appropriate amount of the mixture.

The above-mentioned adhesive carbon substance becomes abrasion powders by abrasion, and adheres to the surface(s) of at least either of an resin and/or an inorganic material which is/are abraded to form irregularities, and stuck thereto by friction, thereby flattening the abrasion surface.

More specifically, the adhesive carbon substance produces abrasion powders by abrasion, and simultaneously coats the abrasion surface to thereby flatten the surface.

Moreover, with the lubricity of carbon, abrasion can be controlled to thereby reduce irregularities of the abrasion surface.

It is preferred that the adhesive carbon substance to be used for the resin molding material of the present invention be in the form of fiber in order to maintain a good balance of total of the mechanical strength and the abrasion resistance.

As described above, the carbon substance is generally used in the range of 1.5 to 180 parts by mass based on 100 parts by mass of the resin in order to maintain the abrasion resistance of a molded article.

The range is preferably 3 to 100 parts by mass, and more preferably 5 to 50 parts by mass.

The blending amount of the carbon substance is within the above-mentioned range, a high mechanical strength and a high abrasion resistance can be maintained.

More specifically, when the blending amount thereof is 1.5 parts by mass or more, the abrasion resistance effect can be sufficiently demonstrated. When the blending amount is 180 parts by mass or less, the mechanical strength can be remarkably improved to thereby readily obtain a favorable molded article.

As a fibrous carbon substance (adhesive carbon fiber) used for the phenolic resin molding material of the present invention, pitch-based carbon fiber is preferred so as to maintain a high abrasion resistance. Examples of the pitch-based carbon fiber include petroleum-based, coal-based, synthetic-based, and liquefied coal-based carbon fibers. The pitch-based carbon fiber is produced by spinning a pitch, as a raw material, which is produced as a by-product during petroleum refining, rendering the resultant infusible, and carbonizing or graphitizing the resultant at 1,500° C. or higher and 3,000° C. or lower.

The pitch-based carbon fiber is mainly formed of carbon hexagonal net planes, and an isotropic pitch-based carbon fiber is particularly preferred in which the net planes irregularly gather.

As an example of such pitch-based carbon fiber, products of Japan graphite fiber corporation (XN-100-03S) and the like are mentioned.

Hereinafter, the fiber-like carbon substance is referred to as adhesive carbon fiber or is simply referred to as carbon fiber.

Moreover, it is preferred that the above-mentioned adhesive carbon substances be subjected to oxidation treatment, plasma treatment, surface treatments using an epoxy-based resin, a polyamide-based resin, a polycarbonate-based resin, a nylon-based resin, an urethane resin, a silane coupling agent, a titanate coupling agent, etc., from the viewpoint of the improvement in the processability and adhesion to a resin.

In order to facilitate the production of the molding material of the present invention and maintain the mechanical strength, the average fiber length of carbon fibers in a molding material is usually 10 to 500 μm, preferably 20 to 200 μm, and more preferably 30 to 130 μm in a stage after the carbon fibers are kneaded with a resin.

When the average fiber length of carbon fibers in a molding material is 10 μm or more, the mechanical strength is improved, and when the average fiber length of carbon fibers in a molding material is 250 μm or lower, molding of the molding material is facilitated.

The average fiber length of carbon fibers in the present invention refers to the peak position of a fiber length distribution which is obtained by, for example: adding a solvent e.g., acetone, which dissolves a resin, so that an amount of a crushed molding material in a state of B stage (semi-cured) is 10 mass %; immersing the molding material for 24 to 48 hours to thereby dissolve a resin part; casting the resultant to a uniform glass plate; randomly measuring the lengths of all the carbon fibers in a frame of 1 mm square using a microscope; and then repeating the procedure so that the number of measurements becomes 100 or more.

The average fiber diameter of the carbon fibers is usually 5 to 30 μm, preferably 7 to 20 μm, and more preferably 8 to 18 μm.

As the inorganic material used in the resin molding material of the present invention, silica, glass, wollastonite, fluorite, pearl, apatite, zirconia, mullite, alumina, clay, mica, talc, zeolite, aluminium hydroxide, magnesium hydroxide, calcium carbonate, barium sulfate, magnesium borate, etc., are mentioned. These inorganic materials can be used as a mixture of two or more members.

In general, it is preferred that the inorganic material be used in the range of 33 to 350 parts by mass based on 100 parts by mass of the resin.

The range is more preferably 66 to 250 parts by mass, and still more preferably 100 to 230 parts by mass.

When the blending amount of the inorganic material is 33 parts by mass or more, the mechanical strength is increased, and when the addition amount of the inorganic material is 230 parts by mass or lower, the abrasion resistance is improved.

The blending amount needs to be adjusted in accordance with the hardness of the inorganic material to be used.

In the case of the inorganic material having high hardness, the mechanical strength is likely to increase. However, the blending amount of such an inorganic material increases, the abrasion resistance is likely to decrease.

As the form of inorganic materials, a powder, a grain, a fiber, etc., are mentioned.

As the form of inorganic materials, an inorganic material in the form of a spherical particle is preferred rather than an inorganic material in the form of an infinite particle from the viewpoints of the abrasion resistance and the fluidity of a molding material.

The average particle diameter of spherical particles is preferably 50 μm or lower, which facilitates compact dispersion with a carbon substance and/or a resin.

The average particle diameter of spherical particles is more preferably 10 to 40 μm, and still more preferably 15 to 35 μm.

When the average particle diameter is 50 μm or lower, the dimension of crushed powder becomes small. Thus, the abrasion resistance effect is increased.

Moreover, an inorganic material in the form of fiber is preferred from the viewpoint of the mechanical strength of a molding material.

More specifically, when the molding material contains an inorganic fiber, the mechanical strength of the molded article to be obtained is improved.

The average fiber diameter of an inorganic fiber is not limited, and is usually 5 to 50 μm, preferably 6 to 40 μm, and more preferably 6 to 30 μm.

By the use of fibers whose diameters are in the range of the average fiber diameter, the processability in a stage of forming the fiber into a molding material can be improved.

The average fiber length of fibers is not particularly limited, and is usually 10 to 500 μm, preferably 20 to 200 μm, and more preferably 30 to 130 μm in a stage after the fibers are kneaded with a resin.

By the use of fibers whose lengths fall in the range of the average fiber length, the processability and moldability at the time of forming the inorganic fiber into a molding material and the strength of a molded article can be improved.

It is preferred for the resin molding material of the present invention to contain at least one kind selected from silica, glass, and wollastonite (Mohs strength: 4 to 5) as an inorganic material.

As silica, a spherical silica is more preferred from the viewpoint of the balance of ease of crushing, the size of crushed powder, hardness, etc.

As glass, a glass fiber is preferred.

The average fiber diameter of glass fibers is not limited, and is usually 6 to 15 μm.

By the use of glass fibers whose fiber diameters fall in the range of the average fiber diameter, the processability in a stage of forming the glass fiber into a molding material can be improved.

The average fiber length of glass fibers is not particularly limited. It is preferred to use chopped strand glass fibers whose average fiber lengths are usually 1 to 6 mm, preferably 1 to 5 mm, and more preferably 1 to 4 mm before kneading.

By the use of glass fibers whose lengths fall in the range of the average fiber length, the average fiber length of glass fibers when the glass fibers are kneaded with a resin is usually 10 to 500 μm, preferably 20 to 200 μm, and more preferably 30 to 130 μm. The processability and the moldability at the time of forming the glass fiber into a molding material and the strength of a molded article can be improved.

Wollastonite is blended in an amount of more preferably 100 to 200 parts by mass based on 100 parts by mass of the resin.

When the carbon substance and the inorganic material are compactly dispersed on the abrasion surface of a molded article, abrasion powders generated from an adhesive carbon substance is likely to uniformly adhere to at least either of the resin and the inorganic material which are exposed to the abrasion surface.

Thus, the abrasion powder generated from the adhesive carbon substance uniformly coats thoroughly the abrasion surface and the lubricity of the carbon contained in the abrasion powder is exhibited, whereby the abrasion resistance effect can be increased.

Therefore, in order to increase the abrasion resistance effect, the blending proportion of the inorganic material and the adhesive carbon substance is in the range of $0.19 \leq \alpha \leq 233$ when a value obtained by dividing the part by mass of the inorganic material based on 100 parts by mass of the resin by the part by mass of the adhesive carbon substance based on 100 parts by mass of the resin is defined as "$\alpha$".

The proportion thereof is preferably $0.6 \leq \alpha \leq 83$, and more preferably $1.8 \leq \alpha \leq 46$.

When the value $\alpha$ is in the above-mentioned range, the abrasion resistance is sufficient.

More specifically, when the value $\alpha$ is 0.19 or more, the amount of the carbon substance is appropriate. Therefore, the abrasion resistance effect is excellent and also the mechanical strength is improved.

When the value α is 233 or lower, the amount of the carbon substance contained in abrasion powder is appropriate. Therefore, the abrasion powder easily coat uniformly the abrasion surface and the lubricity of the carbon is sufficiently demonstrated, whereby the abrasion resistance effect is increased.

Compared with a case where only the adhesive carbon substance is added or a case where only the inorganic material is added, in a case where both the adhesive carbon substance and the inorganic material are added, even when the amount of the adhesive carbon substance to be added is reduced, an extremely high abrasion resistance effect is obtained and the mechanical strength (e.g., Charpy impact strength and flexural strength) is high due to a synergistic effect resulting from the addition of both the substances.

Also in a case where only the adhesive carbon substance is added and the inorganic material is not added, an effect of improving the abrasion resistance is obtained. However, a large amount of adhesive carbon substance needs to be added.

More specifically, when both the adhesive carbon substance and the inorganic material are used together, the following advantages are obtained.

Because the inorganic material is inexpensive compared with the pitch-based carbon fiber, which is one of the adhesive carbon substances, the production cost can be reduced without lowering the mechanical strength.

Reasons why an extremely high abrasion resistance effect and a favorable mechanical strength are achieved when the adhesive carbon substance and the inorganic material are used together are estimated as follows.

More specifically, frictional abrasion at an early stage further facilitates the generation of abrasion powder of the adhesive carbon substance derived from the inorganic material contained in a molding material.

When the abrasion powder derived from the adhesive carbon substance adheres to the abrasion surface containing the inorganic material, the generation of abrasion powder of the inorganic material is suppressed to thereby demonstrate an abrasion resistance.

Therefore, when the inorganic material contributes to the generation of abrasion powder of the adhesive carbon substance at an early stage of abrasion and then an abrasion resistance effect appears, i.e., the abrasion surface is coated with the adhesive carbon substance, the inorganic material is not sharply worn away from then on. Thus, the inorganic material then contributes to maintaining the mechanical strength.

With respect to the mechanical strength, it is considered that because the mechanical strength of the adhesive carbon substance itself is low, the mechanical strength of the molding material decreases with increase in the content of the adhesive carbon substance.

Thus, by the combined use of the inorganic material and the adhesive carbon substance, the content of the adhesive carbon substance can be reduced while maintaining a high abrasion resistance effect. Therefore, a favorable mechanical strength is obtained in a molding material.

In the molding material of the present invention, it is preferred to combine silica and glass as the inorganic material rather than using silica or glass singly from the viewpoint of a balance of the abrasion resistance, fluidity, and mechanical strength of the molding material.

In particular, the combination of a spherical silica and a glass fiber is preferred.

By combining a glass fiber, the strength of the molding material can be increased.

In the case where only wollastonite and the adhesive carbon substance are added as the main fillers of the molding material of the present invention, the abrasion effect of the molded article to be obtained is high, but the mechanical strength may be insufficient.

In such a case, it is preferred to add a filler in the form of fiber as a reinforcing fiber.

Mentioned as such a reinforcing fiber are: inorganic fibers, such as the above-mentioned glass fiber, known rockwool, a ceramic fiber, a boron fiber, a silicon carbide fiber, and an alumina fiber; organic fibers such as a split pulp, a powder pulp, a crushed cloth, and aromatic polyaramide fiber; a metal fiber, etc.

By adding such a reinforcing fiber, the mechanical strength of the molded article to be obtained is improved.

In the present invention, it is preferred to add a glass fiber as a reinforcing fiber as described above.

The lubricative substance used in the present invention is a substance having a property of reducing the dynamic friction coefficient of a particulate granular substance.

As the lubricative substance, there is exemplified at least one kind of resin selected from a polyethylene resin, a nylon resin, a fluororesin, and a polypropylene-based resin. Specifically, for example, a low density polyethylene resin, a middle density polyethylene resin, a high density polyethylene resin, a nylon 6 resin, a nylon 66 resin, polytetrafluoroethylene (PTFE: polytetrafluoroethylene resin), a trifluoro chlorinated ethylene resin, a tetrafluoroethylene hexafluoropropylene resin, a propylene single polymer, a propylene-ethylene copolymer, and mixtures thereof are mentioned.

When the lubricative substance such as a polyethylene resin, a nylon resin, a fluororesin, or a polypropylene resin is used as a resin in the resin molding material of the present invention, there is no need for adding another lubricative substance.

As the lubricative substance, a fluororesin is preferred and polytetrafluoroethylene is more preferred.

The particulate granule form refers to a form in which the above-mentioned lubricative substance is physically crushed and is formed into a sphere.

The average particle diameter of particulate granules of the lubricative substance is usually 2 to 110 μm.

When the average particle diameter is 2 μm or more, the handling thereof is facilitated and when the average particle diameter is 110 μm or lower, the moldability and the appearance of a molded article are favorable.

The average particle diameter is preferably 2 to 130 μm, and more preferably 40 to 100 μm.

In general, the blending amount of the lubricative substance is preferably 0.2 to 35 parts by mass, more preferably 1 to 25 parts by mass, and still more preferably 3 to 17 parts by mass based on 100 parts by mass of the resin.

When the blending amount thereof is 0.2 parts by mass or more, the abrasion effect is obtained and when the blending amount thereof is 35 parts by mass or lower, the moldability is favorable.

When the particle diameter of the lubricative substance increases, there is a tendency that it is difficult to maintain an excellent dispersibility due to the slipping properties of the particle surfaces.

The molding material of the present invention contains the adhesive carbon substance and the inorganic material. Therefore, when both of them are combined for use, the abrasion surface has smoothness and slipping properties, therefore, an extremely high abrasion resistance effect is obtained and the mechanical strength (e.g., Charpy impact strength and bending strength) is high, even when the lubricative substance is not added. However, when the lubricative substance is further added thereto, the abrasion resistance is remarkably improved due to the synergistic effect of the adhesive carbon substance, inorganic material, and lubricative substance.

Moreover, because the synergistic effect is obtained by adding a small amount of the lubricative substance, it is possible to suppress increase in the cost while maintaining favorable mechanical strength, moldability, and processability.

The abrasion resistance effect of the lubricative substance is estimated to be as follows as an effect of promoting the synergistic effect of the adhesive carbon fiber and the inorganic material.

In the present invention, among the abrasion powders generated by abrasion, mainly the abrasion powder derived from the adhesive carbon substance adheres to the abrasion surface and functions as abrasion resistance coating.

When the lubricative substance, even in a slight amount, uniformly exists in the abrasion resistance coating part, the slipping of the abrasion resistance coating itself is improved and the abrasion resistance effect is improved.

In general, when the lubricative substance is added to the molding material, the abrasion resistance is improved. However, because the moldability, processability, and mechanical strength decrease, there is a problem that the addition amount of the lubricative substance is limited.

By the combined use of the adhesive carbon substance and the inorganic material, even when the addition amount of the lubricative substance in the invention is as light amount, the abrasion resistance is remarkably increased, and the increase in the cost due to the addition of the lubricative substance can be reduced while maintaining a favorable mechanical strength, moldability, and processability.

The resin molding material of the present invention, in addition to the component described above, may contain an additive conventionally used in a range without impairing the object of the present invention: stearates such as calcium stearate, magnesium stearate, and magnesium stearate: a mold release agent such as carnauba wax; polyfunctional phenol compounds such as catechol and bisphenol A; sulfonates such as p-toluene sulfonate and p-phenolsulfonate; carboxyl acids such as benzoic acid, salicylic acid, oxalic acid, and adipic acid; metal complexes such as cobalt (II) acetylacetonate, aluminium (III) acetylacetonate, and zirconium (IV) acetylacetonate; metal oxides such as calcium oxide, cobalt oxide, magnesium oxide, and iron oxide; curing assistants such as calcium hydroxide, imidazole, diazabicyclo undecene, and phenylphosphonic acid; pigments such as titanium oxide, red oxide, carbon black, molybdenum red, and phthalocyanine blue; a lubricity imparting agent such as molybdenum bisulfide; and elastomers such as a polyester resin, a polyurethane resin, a polyamide resin, polybutadiene, a styrene-butadiene-styrene copolymer, a polyvinyl acetate resin, and styrene-isoprene resin.

As a method of producing the resin molding material of the present invention, a usual method is adopted.

More specifically, various additives such as a resin, a curing agent, a carbon substance, an inorganic material, a lubricative substance, another inorganic material, a reinforcing fiber, a mold release agent, a curing assistant, and a pigment are added, and uniformly mixed. Then, the mixture was kneaded under heating by using kneaders singly such as a heating roll, a co-kneader, or a biaxial extruder or by a combined use of a roll and another mixer. Then, the resultant was pelletized by crusher or a granulator, to thereby obtain a resin molding material.

EXAMPLES

Hereinafter, the present invention will be further specifically described with reference to examples and comparative examples of the present invention, but is not limited to the examples.

First, measurement methods of the adhesion, true specific gravity, Raman spectroscopy spectrum, and X-ray diffraction of the carbon substance used in the present invention are described below.

Moreover, methods of measuring the fiber length, flexural strength, flexural modulus, Charpy impact strength, sliding abrasion wear, and moldability of molded articles of test samples which were obtained by molding various molding materials and methods of evaluating the abrasion surfaces of the test samples after a sliding abrasion test will be described.

The used carbon fiber was subjected to the adhesion test again.

Injection molding and press molding were performed at a die temperature of 180° C. and a curing time of 1 minute.

(Adhesion Test of Carbon Substance)

The adhesion of the carbon substance of the invention was determined as follows: a glass plate having no irregularities was fixed to a base at room temperature (25° C.); a carbon substance which had been weighed to 10 to 30 mg was placed on the center portion of the surface of the plate to which load was applied; the carbon substance was moved back and forth 100 times over the length of 4 cm, respectively, while applying a load of 3 kgf/cm$^2$ (0.294 MPa); and then a cotton gauze cloth was moved back and forth 10 times on the glass plate under a load of 10 g (98 mN) to thereby thoroughly remove the carbon substance which remained in the form of particle on the surface of the glass plate. Then, it was judged that the carbon substance which adhered to and remained on the surface of a glass plate in a proportion of 0.1 mass % or higher of the total mass X of carbon material placed on the glass plate had adhesion, and the carbon substance having the proportion of lower than 0.1 mass % had no adhesion.

(True Specific Gravity)

The true specific gravity was measured by a butanol substitution method (JIS R 7222, physical property measurement method of a graphite raw material) employing a specific gravity bottle.

(X-Ray Diffraction)

Powder X-ray diffraction measurement was performed using an X-ray diffractometer (RINT, manufactured by Rigaku Denki Co., Ltd.).

A carbon substance was formed into a powder, and was filled in a recess part of a sample holder formed of quartz to be flat, to thereby obtain a measurement sample. The measurement sample was measured by using Cu—Kα ray as an X-ray source and adjusting the output to 40 kv and 20 mA. A standard silicon (SRM640c) was measured under the same conditions.

(Fiber Length)

With respect to the fiber length, the peak position of a fiber length distribution was obtained. The fiber length distribution was obtained by: adding acetone so that an amount of a crushed molding material in a state of B stage was 10 mass %; immersing the molding material for 24 to 48 hours to thereby dissolve a resin part; casting the resultant to a uniform glass plate; measuring the lengths of all the carbon fibers in a frame of 1 mm square around at random using a microscope; and then repeating the procedure so that the number of measurements became 100 or more.

(Bending Elasticity and Bending Strength)

A test sample (4 mm in thickness, 10 mm in width, and 80 mm in length) produced according to JIS K 6911 was measured by Tensilon manufactured by Shimadzu Corporation.

The measurement conditions were as follows: Span distance: 64 mm and Head speed: 2 mm/min.

(Charpy Impact Strength)

A test sample produced according to JIS K 6911 was measured by a Charpy impact testing machine manufactured by TOKYOKOKI SEIZOSHO LTD.

(Injection-Molding Property)

A sample capable of being subjected to continuous injection molding was evaluated and denoted by ◯ and a sample not capable of being subjected to continuous injection molding was evaluated and denoted by X (Kneading Property)

When a sample was kneaded using a heating roller, a sample capable of being kneaded was evaluated and denoted by ◯ and a sample not capable of being kneaded was evaluated and denoted by X.

(Sliding Abrasion Wear)

A cylindrical abrasion ring (a rotor, formed of stainless steel, 18 mm in diameter, 10 mm in width, specific gravity of 7.86) was disposed in such a manner that a test sample (stator) was in line-contact with the abrasion ring at two symmetrical places on an upper portion of the abrasion ring and a load of 3 kg was equally applied to the two contact parts.

The rotor was rotated at 60 rpm for 10 hours, and then a value obtained by dividing the abraded mass the rotor and the stator by the specific gravity of a material for each of the rotor and the stator was calculated.

(Abrasion Surface State)

The abrasion surface of the stator after a sliding abrasion test was observed under a scanning electron microscope for evaluation.

Table 1 shows adhesion test results of carbon substances.

TABLE 1

| Carbon substance kind | Product name | Manufacturer | Adhesion | True specific gravity | T1/T2 | Remark |
|---|---|---|---|---|---|---|
| Pitch-based carbon fiber | XN-100-03S | Japan Graphite fiber corporation | Yes | 2.10 | 1.6 | |
| | XN-100-03Z | | Yes | 2.10 | 1.6 | |
| | XN-P9C-03Z | | No | 1.77 | 20 | |
| | K223QG | Mitsubishi Chemical Functional Products, Inc. | No | 2.14 | 2.6 | The carbon fiber adhered in an extremely slight amount and had abrasion resistance effect. |
| | K223GM | | Yes | 1.90 | 13.1 | |
| | K223SE | | Yes | 1.89 | 13.6 | |
| | C203 | KUREHA CORPORATION | No | 1.58 | 17.6 | |
| | C103 | | No | 1.63 | 22.7 | |
| | S244 | Osaka Gas Chemical Co., Ltd. | No | 1.6 | 25.3 | |
| | SG-244A | | No | 1.6 | 19.4 | |
| PAN-based carbon fiber | HTA-C3-E | Toho Tenax Co. | No | 1.74 | 19.2 | |
| Graphite | FX-35 Powder | Showa Denko K.K. | No | — | — | |
| | HGF-L | Hitachi Chemical Co., Ltd. | Yes | — | 1.6 | |
| | KS-15 | TIMCAL, LTD. | Yes | — | 1.9 | |

Examples 1 to 13 and Comparative Examples 1 to 11

Raw materials shown in Table 2 were used and the raw materials were blended in blending proportions shown in Tables 3 and 4. The mixtures were kneaded under heating to obtain molding materials.

However, in Example 13, components except carbon fiber were blended, and kneaded under heating. Then, the mixtures was crushed, and carbon fiber was mixed thereto using a mixer to obtain a molding material.

Next, each molding material was injection-molded to form a test sample, and the molded article of each test sample was subjected to the above-described evaluations.

However, in Example 13, the molding material was press-molded to form a test sample, and the molded article of the test sample was evaluated.

The used carbon fiber was subjected to the adhesion test again.

The results were shown in Tables 3 and 4.

TABLE 2

| | Raw material | | Product name | Dimension (before kneading) | Manufacturer |
|---|---|---|---|---|---|
| Phenolic resin | Novolac type phenolic resin | | HP-700NK | | Hitachi Chemical Co., Ltd. |
| | | | HP-1100 | | |
| | Resol type phenolic resin | | HP-190R | | |
| Carbon substance | Pitch-based carbon fiber | (1) | XN-100-03S | Average fiber diameter 10 μm<br>Average fiber length 3 mm | Japan Graphite fiber corporation |
| | | (2) | K223GM | Average fiber diameter 12 μm<br>Average fiber length 6 mm | Mitsubishi Chemical Functional Products, Inc. |
| | | (3) | C103 | Average fiber diameter 12-18 μm<br>Average fiber length 3 mm | KUREHA CORPORATION |
| | PAN-based carbon fiber | | HTA-C3-E | Average fiber diameter 7 μm<br>Average fiber length 3 mm | Toho Tenax Co. |
| | Graphite | | FX-35 | | Showa Denko K.K. |
| Inorganic material | Wollastonite | | SH-600 | Average particle diameter 12 μm<br>Average fiber length 260 μm | KINSEI MATEC CO., LTD |
| | Glass fiber | | RES015-BM38 | Average fiber diameter 10-13 μm<br>Average fiber length 1.5 mm | NSG Vetrotex K.K. |
| | Spherical silica | | S-COX-31 | Average particle diameter 21 μm | MICRON Co., Ltd. |
| Lubricative substance | Fluororesin particle | | KT-300 | | Kitamura Co., Ltd. |

TABLE 3

| | | Examples | | | | | | |
|---|---|---|---|---|---|---|---|---|
| Item | Unit | 1 | 2 | 3 | 4 | 5 | 6 | 7 |
| Resin mixture * | Part by mass | 30 | 30 | | 30 | 30 | 30 | |
| Resol type phenolic resin | | | | 30 | | | | 30 |
| Pitch-based carbon fiber (1) | | 5 | 5 | 5 | 20 | 20 | 20 | 20 |
| Pitch-based carbon fiber (2) | | | | | | | | |
| PAN-based carbon fiber | | | | | | | | |
| Graphite | | | | | | | | |
| Wollastonite | | 45 | 45 | 45 | | | | |
| Glass fiber | | 20 | 20 | 20 | | | 20 | 20 |
| Spherical silica | | | | | 34 | 30 | 22 | 22 |
| Fluororesin particle | | 1 | | | | | | |
| Adhesion of a carbon substance ** | — | Yes (2) | Yes (2) | Yes (2) | Yes (2) | Yes (2) | Yes (2) | Yes (2) |
| Bending strength | Mpa | 138 | 135 | 133 | 130 | 128 | 151 | 150 |
| Bending elasticity | Mpa | 18,380 | 18,500 | 18,400 | 17,000 | 17,000 | 16,900 | 16,880 |
| Charpy impact strength | kJ/m$^2$ | 3.3 | 4.3 | 4 | 2.5 | 2.5 | 2.4 | 2.4 |
| Stator abrasion loss | mm$^3$ | 0.1 | 0.4 | 0.4 | 0.2 | 0.2 | 0.2 | 0.2 |
| Rotor abrasion wear | mm$^3$ | 0.01 | 0.06 | 0.06 | 0.1 | 0.1 | 0.1 | 0.1 |
| Abrasion surface state | — | Smoothness | Smoothness | Smoothness | Smoothness | Smoothness | Smoothness | Smoothness |
| Injection molding property | — | ○ | ○ | ○ | ○ | ○ | ○ | ○ |

TABLE 3-continued

| | | | | | | | | |
|---|---|---|---|---|---|---|---|---|
| Kneading property | — | ○ | ○ | ○ | ○ | ○ | ○ | ○ |
| Carbon fiber length | μm | — | — | — | 75 | — | 86 | 74 |

| | | Examples | | | | | |
|---|---|---|---|---|---|---|---|
| Item | Unit | 8 | 9 | 10 | 11 | 12 | 13 |
| Resin mixture * | Part by mass | 30 | 30 | 30 | 30 | 30 | 30 |
| Resol type phenolic resin | | | | | | | |
| Pitch-based carbon fiber (1) | | 10 | 10 | 5 | 5 | | 20 |
| Pitch-based carbon fiber (2) | | | | | | 50 | |
| PAN-based carbon fiber | | | | | | | |
| Graphite | | | | | | | |
| Wollastonite | | | | | | | |
| Glass fiber | | 25 | 30 | 25 | 30 | 15 | 20 |
| Spherical silica | | 26 | | 32 | | | 22 |
| Fluororesin particle | | | | | | | |
| Adhesion of a carbon substance ** | — | Yes (2) | Yes (2) | Yes (2) | Yes (2) | Yes (1) | Yes (2) |
| Bending strength | Mpa | 153 | 143 | 155 | 150 | 148 | 167 |
| Bending elasticity | Mpa | 16,800 | 16,100 | 16,820 | 13,500 | 24,700 | 18,030 |
| Charpy impact strength | kJ/m$^2$ | 3.3 | 3.1 | 4.2 | 4.2 | 3.7 | — |
| Stator abrasion loss | mm$^3$ | 0.5 | 0.5 | 0.60 | 0.6 | 0.1 | 0.2 |
| Rotor abrasion wear | mm$^3$ | 0.1 | 0.1 | 0.4 | 0.4 | 0.1 | 0.1 |
| Abrasion surface state | — | Smoothness | Smoothness | Smoothness | Smoothness | Smoothness | Smoothness |
| Injection molding property | — | ○ | ○ | ○ | ○ | ○ | x |
| Kneading property | — | ○ | ○ | ○ | ○ | ○ | *** |
| Carbon fiber length | μm | 83 | — | 75 | — | 75 | 500 |

\* A mixture in which HP-700NK, HP-1100, hexamethylenetetramine, and magnesium oxide were mixed in a mass ratio of 42:42:13:3
\*\* Values in the parentheses represent mass % of an adhesive carbon substance.
\*\*\* Different kneading methods.

TABLE 4

| | | Comparative Examples | | | | | |
|---|---|---|---|---|---|---|---|
| Item | Unit | 1 | 2 | 3 | 4 | 5 | 6 |
| Resin mixture* | Part by mass | 30 | 30 | | 30 | 30 | 30 |
| Pitch-based carbon fiber (3) | | | | | | | |
| PAN-based carbon fiber | | 10 | 5 | | | | |
| Graphite | | | | 5 | 5 | | |
| Wollastonite | | | 45 | | | 45 | 30 |
| Glass fiber | | 20 | | 24 | 30 | 30 | |
| Spherical silica | 33 | 33 | | 34 | 30 | | 22 |
| Adhesion of a carbon substance** | — | No | No | No | No | — | — |
| Bending strength | Mpa | 161 | 153 | 150 | 150 | 148 | 112 |
| Bending elasticity | Mpa | 18,000 | 16,000 | 14,800 | 14,790 | 17,500 | 14,600 |
| Charpy impact strength | kJ/m$^2$ | — | 4.5 | 3.7 | 3.4 | 3.6 | 2.5 |
| Stator abrasion wear | mm$^3$ | 1.6 | 1 | 1 | 1 | 0.6 | 1.5 |
| Rotor abrasion wear | mm$^3$ | 2.4 | 1 | 0.9 | 0.9 | 0.1 | 1 |
| Abrasion surface state | — | Unevenness | Unevenness | Unevenness | Unevenness | Unevenness | Unevenness |
| Injection molding property | — | ○ | ○ | ○ | ○ | ○ | ○ |

TABLE 4-continued

| | | | | | | |
|---|---|---|---|---|---|---|
| Kneading property | — | ○ | ○ | ○ | ○ | ○ | ○ |
| Carbon fiber length μm | 140 | — | — | — | — | — |

| | | Comparative Examples | | | | |
|---|---|---|---|---|---|---|
| Item | Unit | 7 | 8 | 9 | 10 | 11 |
| Resin mixture* | Part by mass | 30 | 30 | 30 | 30 | 30 |
| Pitch-based carbon fiber (3) | | | | | | 38 |
| PAN-based carbon fiber | | | | | | |
| Graphite | | | | | | |
| Wollastonite | | 30 | 60 | | | |
| Glass fiber | | | 15 | 25 | 30 | 15 |
| Spherical silica | | 33 | 30 | | 37 | 30 |
| Adhesion of a carbon substance** | — | — | — | — | — | No |
| Bending strength | Mpa | 114 | 132 | 154 | 154 | 144 |
| Bending elasticity | Mpa | 15,000 | 17,200 | 16,098 | 16,100 | 15,160 |
| Charpy impact strength | kJ/m² | 2.6 | 3.6 | 4.6 | 4.7 | 3.6 |
| Stator abrasion wear | mm³ | 1.5 | 0.7 | 1.5 | 0.70 | 0.9 |
| Rotor abrasion wear | mm³ | 1 | 0.1 | 1.8 | 1.1 | 0.9 |
| Abrasion surface state | — | Unevenness | Unevenness | Unevenness | Unevenness | Unevenness |
| Injection molding property | — | ○ | ○ | ○ | ○ | ○ |
| Kneading property | — | ○ | ○ | ○ | ○ | ○ |
| Carbon fiber length | μm | — | — | — | — | — |

*A mixture in which HP-700NK, HP-1100, hexamethylenetetramine, and magnesium oxide were mixed in a mass ratio of 42:42:13:3

As is clear from Tables 3 and 4, Examples 1 to 13 are excellent in the abrasion resistance as compared with Comparative Examples 1 to 4 and 13 in which carbon substances having no adhesion were used (The true specific gravity and the half-width ratio (T1)/(T2) of the X-ray diffraction peak were outside the range specified in this application) and Comparative Examples 5 to 12 in which no carbon substance was contained.

In examples, injection-molding property is excellent, except for Example 13 in which the carbon fiber length after kneading is long.

Examples 1 to 3 containing wollastonite are excellent in the abrasion resistance as compared with other examples, and, among examples, Example 1 containing the lubricative substance is most excellent in the abrasion resistance.

As is clear from the above, in the present invention, it is clear that the mechanical strength and the abrasion effect are improved due to the synergistic effect of wollastonite and the adhesive carbon substance and, by adding a slight amount of the lubricative substance, the abrasion resistance effect is further improved.

INDUSTRIAL APPLICABILITY

As described above, it is revealed that the resin molding material of the present invention is remarkably excellent in the abrasion resistance without impairing the mechanical strength by virtue of co-existence of the adhesive carbon substance the inorganic material, and further the lubricative substance in a resin.

Moreover, it is revealed that the abrasion resistance can be improved by adding a slight amount of lubricative substance.

Further, more excellent mechanical strength is obtained by using a glass fiber and the like together as a reinforcing fiber.

Due to such properties, the resin molding material of the present invention is suitable as a sliding unit material formed of a resin.

The invention claimed is:

1. A resin molding material, comprising: a resin; a carbon substance; and an inorganic substance, wherein
   (i) the carbon substance is in a form of a fiber,
   (ii) the carbon substance includes an adhesive carbon substance,
   (iii) the carbon substance has a true specific gravity of 1.8 or more, and
   (iv) the carbon substance has a half-power band width ratio (T1/T2) of 17 or lower, wherein T1 is a half-power band width of a diffraction peak of a surface (002) observed by an X-ray diffraction and T2 is a half-power band width of a diffraction peak of a standard silicon surface (111) observed under the same conditions.

2. A resin molding material according to claim 1, wherein a content of the inorganic substance is 33 to 350 parts by mass based on 100 parts by mass of the resin.

3. A resin molding material according to claim 1, wherein the resin comprises a phenolic resin.

4. A resin molding material according to claim 1, wherein the inorganic substance is at least one kind selected from silica, glass, and wollastonite.

5. A resin molding material according to claim 4, wherein the silica comprises a spherical silica.

6. A resin molding material according to claim 4, wherein the glass comprises a glass fiber.

7. A resin molding material according to claim 4, wherein a content of wollastonite is 80 to 200 parts by mass based on 100 parts by mass of the resin.

8. A resin molding material according to claim 1, wherein the carbon substance in the form of fiber comprises a pitch-based carbon fiber.

9. A resin molding material according to claim 1, wherein an average fiber length of the carbon substance in the form of fiber is 10 to 250 μm in a stage after the carbon substance is kneaded with a resin.

10. A resin molding material according to claim 1, further comprising a lubricative substance.

11. A resin molding material according to claim 10, wherein the lubricative substance is at least one kind selected from a polyethylene resin, a nylon resin, a fluororesin, and a polypropylene-based resin.

12. A resin molding material according to claim 11, wherein the lubricative substance comprises a fluororesin.

13. A resin molding material according to claim 12, wherein the fluororesin comprises polytetrafluoroethylene.

14. A resin molding material according to claim 10, wherein an average particle diameter of the lubricative substance is 2 to 110 μm.

15. A resin molding material according to claim 10, wherein a content of the lubricative substance is 0.2 to 35 parts by mass based on 100 parts by mass of the resin.

16. A resin molding material according to claim 1, wherein a content of the adhesive carbon substance is 1.5 to 180 parts by mass based on 100 parts by mass of the resin.

17. A resin molding material according to claim 1, wherein said true specific gravity of the carbon substance is 1.8 to 2.5.

18. A resin molding material according to claim 1, wherein a blending proportion of the inorganic substance and the adhesive carbon substance is in a range of $0.19 \leqq \alpha \leqq 233$, where $\alpha$ is a value obtained by dividing parts by mass of the inorganic substance, based on 100 parts by mass of the resin, by parts by mass of the adhesive carbon substance based on 100 parts by mass of the resin.

* * * * *